(No Model.)
N. W. HOLT.
DUST COLLECTOR.
No. 333,463. Patented Dec. 29, 1885.
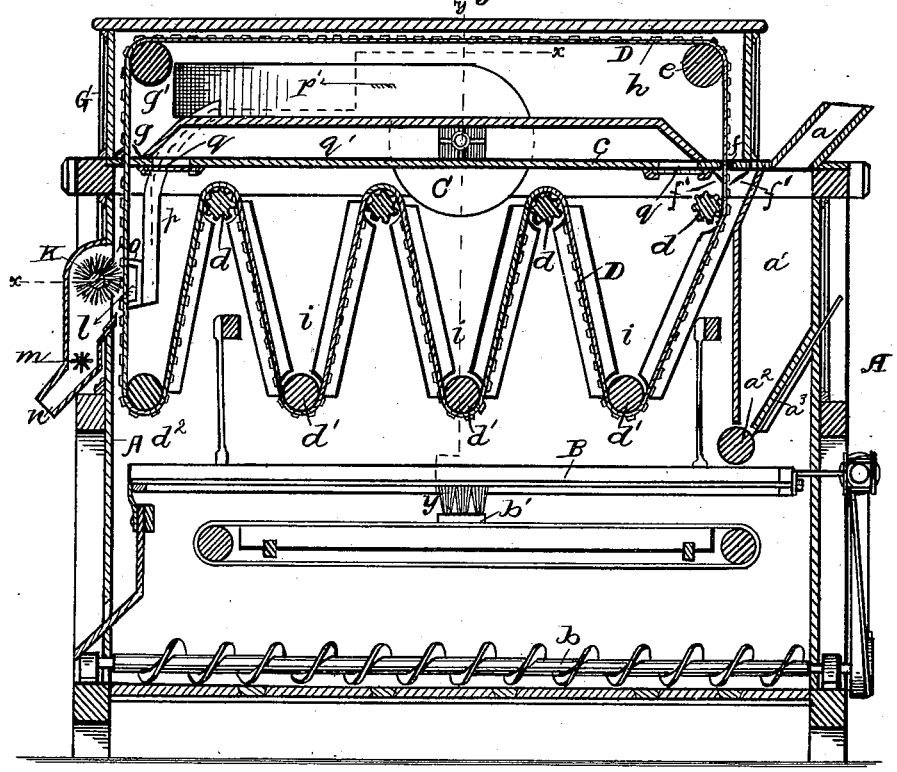
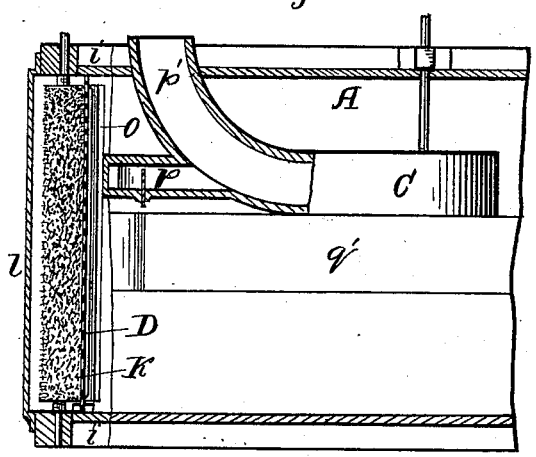
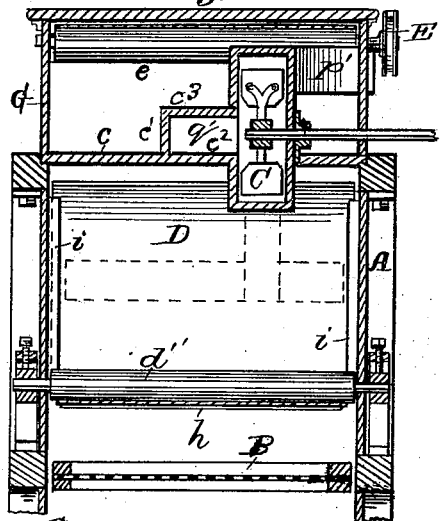
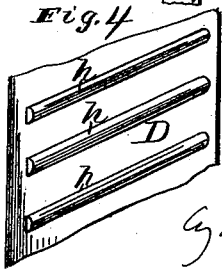
Witnesses:
J. C. Turner
B. W. Sommers
Inventor:
Noah W. Holt
G. Doubleday & Blin
atty.

United States Patent Office.

NOAH WILLIAM HOLT, OF JACKSON, MICHIGAN, ASSIGNOR TO THE GEORGE T. SMITH MIDDLINGS PURIFIER COMPANY, OF SAME PLACE.

DUST-COLLECTOR.

SPECIFICATION forming part of Letters Patent No. 333,463, dated December 29, 1885.

Application filed September 29, 1885. Serial No. 178,557. (No model.)

*To all whom it may concern:*

Be it known that I, NOAH W. HOLT, a citizen of the United States, residing at Jackson, in the county of Jackson and State of Michigan, have invented certain new and useful Improvements in Dust-Collectors, of which the following is a specification, reference being had therein to the accompanying drawings.

Figure 1 is a longitudinal sectional elevation of a middlings-purifier provided with my improved dust-collector. Fig. 2 is a longitudinal section in line $x\ x$, Fig. 1. Fig. 3 is a vertical cross-section in line $y\ y$, Fig. 1. Fig. 4 is a perspective view of a portion of the filter-cloth.

Like letters of reference refer to like parts in the several figures.

A represents the inclosing frame or casing of a middlings-purifier of any suitable and well-known construction.

$a$ represents the feed-spout, $a'$ the feed-hopper, $a^2$ the feed-roller, and $a^3$ the feed-slide.

B represents the shaking-sieve, on which the material is treated in the purifier, and $b$ represents the conveyer arranged underneath the sieve, whereby the material which has passed through the sieve is collected and removed.

$b'$ represents the traveling brush, whereby the sieve is kept clear.

C represents the fan, whereby an air-current is drawn upwardly through the meshes of the sieve.

$c$ represents the top plate or cover of the inclosing-casing A.

$c'\ c^2\ c^3$ are respectively the side walls and the top wall of an air-trunk, $q'$, the bottom of which is the top plate, $c$. The wall $c'$ is continuous from end to end of the trunk, as is the top wall, $c^3$; but the other side wall, $c^2$, is broken away at the eye of the fan, (see Figs. 1 and 3,) to permit air to be drawn into the fan.

D represents a traveling endless filter-cloth, which is arranged in the upper portion of the machine, in the air passage or chamber leading from the sieve B to the fan C, in such manner that the air passes through the cloth D and deposits the dust with which it is charged against the under side of the filter-cloth, the latter being of such texture that it will permit only the air to pass through, and will intercept the dust which is removed by the air-current from the material treated on the sieve. The cloth D runs in a zigzag direction around corrugated rollers $d$, arranged in the upper part of the machine, and smooth rollers $d'$, as clearly shown in Fig. 1.

$e$ represents the driving-roller, which is arranged above the top plate of the machine, near the head thereof, and driven by an endless chain or belt running over a pulley, E, mounted on one end of the shaft of said roller, or by any other suitable means. The filter-cloth D descends from the roller E, and passes through an opening, $f$, in the top plate, $c$, to the first corrugated roller $d$. The opening $f$ is made in the form of a narrow slit extending across the machine, wide enough to permit the cloth to pass through without obstruction and fitted snugly around the cloth. The opening $f$ may be protected at its under side by elastic strips $f'$, of rubber or other flexible material, which will lie tightly against the cloth and form a practically air-tight joint. The cloth D passes from the roller $d$ around the first lower roller, $d'$, and passes alternately upward and downward to the last roller, $d^2$, which is located at the tail end of the machine. From the roller $d^2$ the cloth D passes upwardly through the opening $g$ in the top plate, $c$, to a guide-roller, $g'$, arranged in line with the driving-roller $e$. The rollers $e$ and $g'$ and the portion of the cloth which lies above the top plate, $c$, are inclosed by a suitable casing, G. Some of the guide-rollers $d$ and $d'$ may be connected with the driving-roller $e$ by endless chains or belts, so as to drive the same, if desired. The cloth D is preferably provided with flat transverse strips $h$, which are secured to the cloth at suitable distances apart, and serve to stretch the cloth and prevent it from wrinkling. Both edges of the cloth D move in the casing A between guides or cleats $i$, which are secured to the side walls of the case A, and form chambers, in which the edges of the cloth are guided, and whereby practically air-tight joints are formed at the edges of the cloth, to prevent the air charged with dust from breaking past the edges of the cloth into the air-space above the same. The transverse strips $h$ extend to the inner sides of the guides $i$, but do not extend into the grooves or channels between the same.

K represents a revolving brush or wiper, which is arranged on the outer side of the ascending portion of the cloth D at the tail end of the machine, and which detaches the dust adhering to the outer sides of the cloth, and delivers the same into a receptacle, $l$, from which it is discharged by a revolving feed-roller, $m$. The latter is constructed with depressions or chambers in its periphery, which discharge the dust into a conduit or spout, $n$, without admitting air to the chamber $l$.

$o$ represents an air-chamber, which is arranged on the inner side of the cloth D opposite the brush K, and which is arranged with its open side against the inner side of the cloth.

$p$ represents an air-spout, which connects the spout $p'$ of the fan C with the air-chamber $o$, so as to deliver an air-current into the same. The air current, entering the chamber $o$, escapes outwardly through the cloth D, and assists in removing the dust from the outer side of the cloth and delivers the dust into the chamber $l$. The air which passes into the chamber $l$ from the chamber $o$ is returned to the interior of the machine by passing through the cloth into the air-chamber above the same.

$q$ represents openings formed in the top plate, $c$, and communicating with an air-trunk, $q'$, leading to the eye of the fan $c$. The openings $q$ are provided with slides, whereby the air-currents are regulated. The ascending air-current, which passes through the shaker-sieve B and the material resting on the same, removes the dust and other light material, and deposits such dust on the under side of the filter-cloth D, while the air passes through the cloth into the air-chamber above the cloth, and passes through the openings $q$ into the air-trunk $q'$ and the fan C, from which it is discharged through the spout $p'$. The corrugated rollers $d$ guide the cloth without forcing the dust deposited on the same into the meshes thereof.

I claim—

1. In a dust-collector, the combination of the series of rollers $d\ d\ d'\ d'$, arranged on parallel lines, the driving-roller $e$, and the roller $g'$, arranged above the rollers $d\ d$, the filter-cloth supported upon the rollers and having its lower portion arranged in zigzag planes, and the casing provided with openings between the rollers $d\ d\ e\ g'$ for the exit of the air, substantially as set forth.

2. In a dust-collector, the combination, with the rollers $d\ d'\ e\ g'$ and the filter-cloth D, of the casing, the fan, and the air-trunk $q'$, substantially as set forth.

3. The combination, with the shaker and the casing surrounding the shaker and forming an air-chamber above it, the rollers $d\ d'\ e\ g'$, and the filter-cloth supported on the rollers $d\ d'$ in zigzag planes, of the top plate, $c$, provided at each end with openings for the passage of the filter-cloth, a fan within the casing, and a spout leading from the fan through the casing of the machine, substantially as set forth.

4. The combination, with the shaker and the casing surrounding the shaker and forming an air-chamber above it, the rollers $d\ d'\ e\ g'$, and the filter-cloth supported on the rollers $d\ d'$ in zigzag planes, of the top plate, $c$, provided at each end with openings for the passage of the filter-cloth, a fan, an air-trunk, $q'$, connecting the fan with the space inclosed between the filter-cloth and the casing, and valves to regulate the passage of air through the air-spout to the fan, substantially as set forth.

5. The combination, with a passage or chamber through which the air charged with dust moves and a traveling filter-cloth, of a fan, C, provided with a blast-pipe, $p'$, air-chamber $o$, and an air-spout, $p$, for connecting said air-chamber with the blast-pipe of the fan, substantially as set forth.

In testimony whereof I affix my signature in presence of two witnesses.

NOAH WILLIAM HOLT.

Witnesses:
GEO. M. WHALEY,
O. L. FAULKES.